Sept. 9, 1924.　　　　　J. KENNEDY, JR　　　　1,507,703
FLYING SHEARS
Filed March 8, 1922　　　2 Sheets-Sheet 1
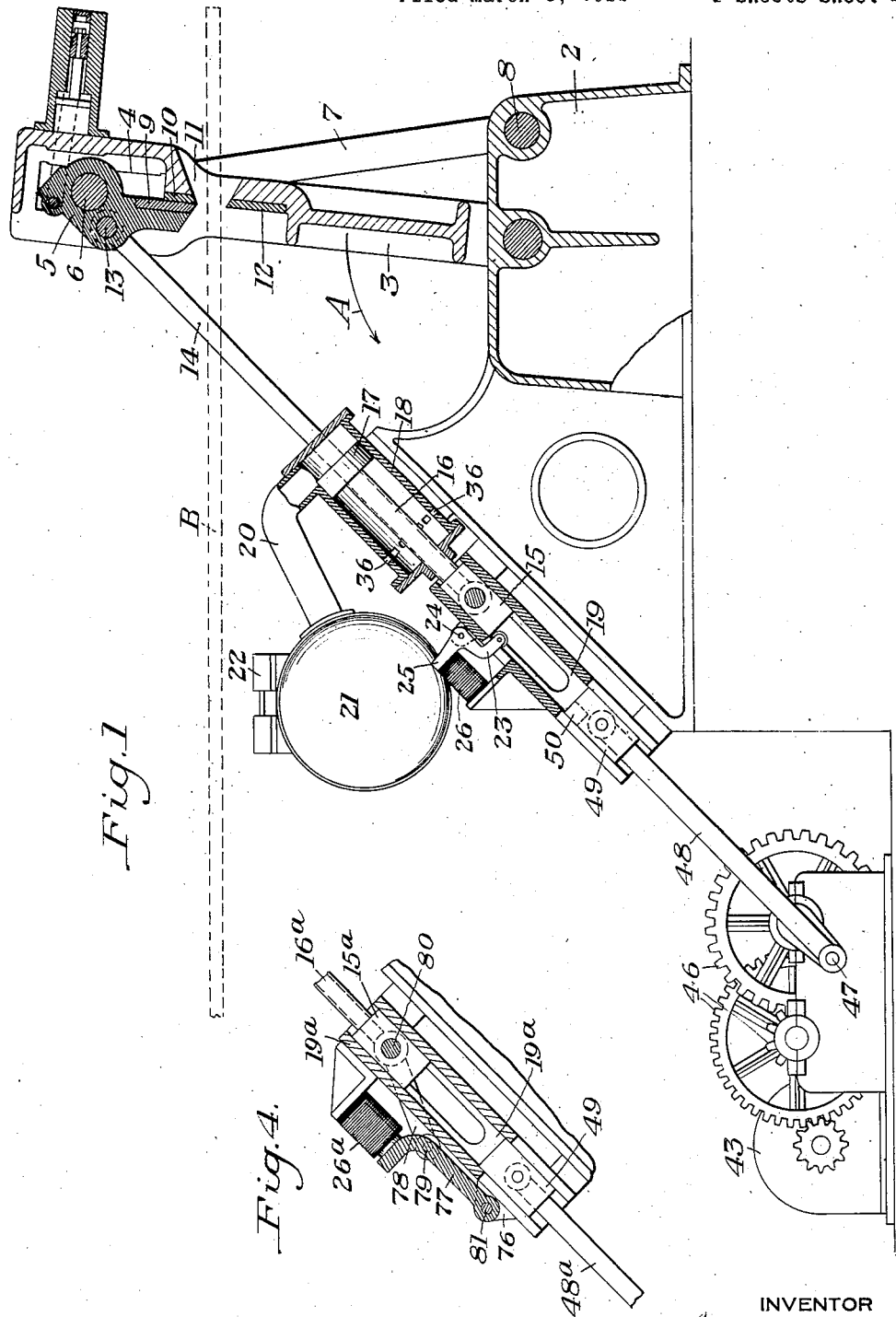
INVENTOR

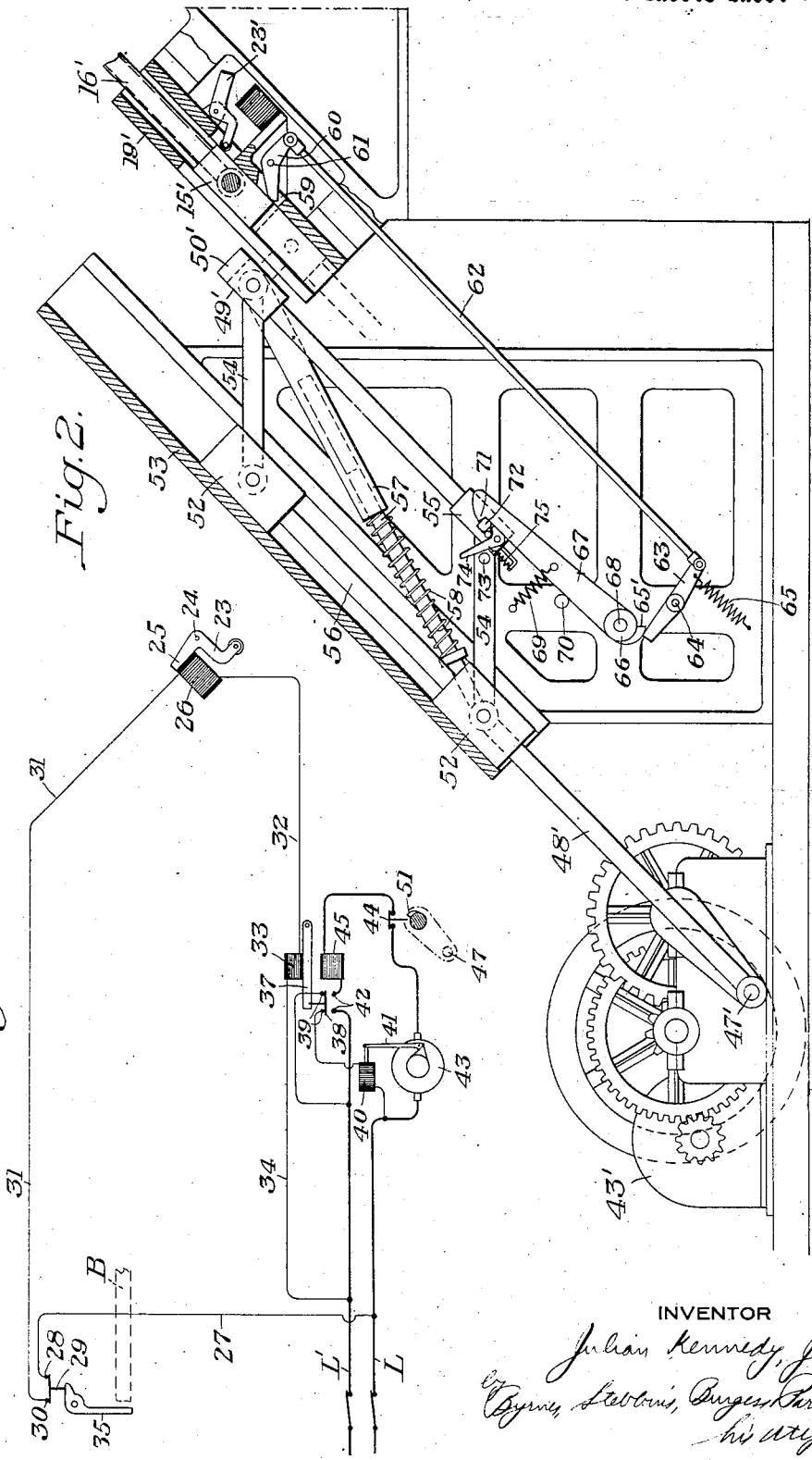

Patented Sept. 9, 1924.

1,507,703

UNITED STATES PATENT OFFICE.

JULIAN KENNEDY, JR., OF PITTSBURGH, PENNSYLVANIA.

FLYING SHEARS.

Application filed March 8, 1922. Serial No. 542,007.

*To all whom it may concern:*

Be it known that I, JULIAN KENNEDY, Jr., a citizen of the United States, residing at Pittsburgh, in the county of Allegheny and State of Pennsylvania, have invented a new and useful Improvement in Flying Shears, of which the following is a full, clear, and exact description, reference being had to the accompanying drawings, forming part of this specification, in which—

Figure 1 is a sectional view partly in elevation, illustrating one form of my invention;

Figure 2 is a similar view illustrating a slightly modified form of my invention, the shearing mechanism per se being omitted; and Figure 3 is a diagrammatic view illustrating one method of electrically controlling the form of my invention shown in Figure 1;

Figure 4 is a detail view illustrating another modification of my invention.

The present invention relates broadly to metal cutting and more particularly to shearing mechanism of the type ordinarily referred to as flying shears for shearing moving metallic bodies as delivered thereto by a rolling mill.

At the present time it is customary to shear such metallic bodies to produce sections of any desired length. Inasmuch as the rolling mill frequently delivers metal at a speed of approximately six hundred feet per minute, it will be understood that means must be provided for quickly operating the shearing mechanism. The mechanism usually employed for this purpose comprises relatively movable shearing blades adapted to be simultaneously moved substantially parallel with the direction of travel of the body to be sheared, and relatively to the body in a direction transversely thereto to effect the shearing operation. Such a construction is shown for example, in the patent to Edwards No. 505,512 of September 26th, 1893. Such a construction is effective so far as the shearing is concerned, but it requires the expenditure of an enormous amount of power due to the fact that the movement of the shearing blades during both the shearing and the return operation is effected by a common source of power, such as steam, water or air.

With such a construction the fluid utilized for producing the return movement of the shearing blades is exhausted to the atmosphere during the succeeding operating stroke of the piston. During the interval between successive operations of the piston it is held in its upper position by the fluid pressure against the lower side of the piston. Due to the absence of the piston rod on the lower side of the piston, a greater effective area is provided, and the desired operation insured.

In the present invention the lower portion of the cylinder is normally open to the atmosphere, and there is no loss, other than leakage, of any of the operating fluid.

The present invention embodies generally the shearing construction illustrated in said patent, although it will be appreciated that other forms of shearing mechanism or modifications thereof may be utilized as desired, but provides a novel actuating means for the shearing blades.

Referring more particularly to that form of invention illustrated in Figure 1, there may be provided either a fixed or sliding bed 2 having pivotally secured thereto a swinging frame 3, the side members of which are provided with vertical ways 4 to guide the movable shear block 5. This shear block in the form of the invention illustrated, comprises a fixed spindle 6, on which may be carried guides of any desired construction adapted to cooperate with the guide ways 4. The opposite ends of the spindle 6 cooperate with links 7, the lower ends of which have a pivotal connection 8 with the bed 2. By reason of this construction, it will be apparent that as the swinging frame is swung about its pivotal connection with the bed in the direction of the arrow A, the shear block will be caused to move downwardly in the guide ways 4. This movement will cause the upper shearing blade 9 to move downwardly from the stop 10 across the opening 11 and into cooperative relationship with the lower blade 12. This will result in shearing the metal body B as it passes from the rolls of a rolling mill through the opening 11.

For producing this swing movement of the frame 3, the shear block 5 is provided with a pin 13 to the opposite ends of which are secured links 14 pivotally connected at their lower ends with the cross-head 15. This cross-head is adapted to be continuously urged in one direction by any desirable means such as a spring or fluid pressure. In the preferred form of the invention it is operated by a piston rod 16, operatively connected with the piston 17, movable in the cylinder 18. The cross-head 15 is guided in its reciprocal movement by guide ways 19 thereby to maintain the same in a definite line of travel. Connected with the upper end of the cylinder 18 is an air line 20 continuously receiving a pressure supply from an air pressure tank 21. The pressure of this tank may be maintained at a fixed point by a comparatively small automatically operated compressor 22. The cross-head 15 is normally prevented from moving downwardly by a catch 23 having a pivotal mounting 24 on the guides 19 and having its free end 25 constructed as an armature adapted to be held in the position shown in Figure 1 by an electric magnet 26. This makes it unnecessary to maintain pressure below the piston to hold it in upper position.

Referring to Figure 3 there are illustrated line wires L and L' receiving current from any desired source. From the wire L there is a connection 27 leading to one contact 28 of a switch 29. The opposite contact 30 of the switch is connected by a wire 31 with the magnet 26. From the magnet 26 the current flows through a wire 32 to a magnet 33 and thence through the wire 34 to line wire L'. Normally the parts are in the position illustrated in this figure. When the desired length of material B has been passed through the shearing mechanism, its end may engage a trip 35 and open the switch 29. This will break the circuit to the magnet 26 thereby releasing the catch 23 and permitting the cross-head 15 to move downwardly. This movement will be an extremely rapid one and will produce a swinging movement of the frame 3 as described, which movement will be substantially parallel with the movement of the body B and at substantially the same speed as the speed with which the body is moving. During this movement the shear block 5 will be lowered to produce the desired relative movement between the shearing blades 9 and 12 for shearing the metal. The descent of the piston 17 is substantially unrestricted during the major portion of its travel due to the provision of relief openings 36 in the cylinder 18. As soon, however, as the piston 17 passes the openings 36, its further descent will be cushioned. The stroke of the piston 17, and the location of the openings 36, are so related that the openings are never completely uncovered by the piston in its downward stroke, and in this manner exhaust of air from the cylinder 18 as supplied by the pressure tank 21, is prevented. This conserves the pressure within the tank and enables me to maintain a substantially uniform pressure therein with a comparatively small expenditure of power.

Opening the circuit of the magnet 26 also opens the circuit of the magnet 33. This permits the armature 37 to drop, moving the switch blade 38 away from the contacts 39 and opening the circuit through the solenoid 40, as will be apparent. This solenoid is adapted, when energized, to apply a brake 41 for the purpose hereinafter described. When deenergized the brake is released. Continued downward movement of the armature 37 brings the switch blade 38 into engagement with the contacts 42. This permits current to flow from the line wire L through the motor 43, switch 44, magnet 45 and switch blade 38 to the line wire L'. This energizes the motor 43 and causes it, through a series of reduction gears 46, as shown in Figure 1, to rotate the crank 47. The crank 47 is connected by a pitman 48 with the slide block 49 movable in the guides 19. Upward movement of the slide block will bring the same into engagement with the cross head 15 and continued operation of the motor will result in forcing the cross head 15 upwardly against the pressure in the cylinder 18, whereby the air compressed therein is returned to the pressure tank 21. As soon as the cross head 15 again reaches the position illustrated in Figure 1, the catch 23 will be permitted to drop into position below the same, this movement being permitted by a pocket 50 in the sliding block 49. Inasmuch as the circuit through the magnet 26 is automatically restored as soon as the end of the body B is sheared, the catch will be held in operative position and descent of the cross head will be prevented. The motor 43 will, however, continue its rotational movement until the switch 44 is opened in any desired manner, as by a cam 51 on the crank shaft 47. This will break the circuit through the motor and through the holding magnet 45, thereby permitting the magnet 33 to attract the armature 37 and close the circuit to the solenoid 40. This will apply the brake 41 to the motor and stop the rotation thereof. It will be understood that the application of the brake will be controlled in such manner that the motor will be permitted to drift a sufficient distance to insure the passage of the cam 51 to such a position that the switch 44 may again move to closed position for the next operation of the device.

From the foregoing it will be understood that I have provided a shearing mechanism in which the movement to shearing position is produced by one source of power, such as air pressure, while the return movement of the shearing mechanism is produced by a separate source of power, such as an electric motor. By reason of the fact that the movement of the shearing mechanism to normal position, which movement I have designated the return movement, need not be accompanied as quickly as the movement of the shearing mechanism to shearing position, it will be apparent that the force expended by the motor 43' may be extended over a greater period of time. This permits the use of a motor having a comparatively low horse power as compared to the horse power which is always developed by the air pressure tank in moving the parts to shearing position. It may be readily shown that the force required is equal to the mass times the acceleration, and the acceleration in turn is equal to two times the distance divided by the square of the time. Inasmuch as the mass, the acceleration, and the distance are constant, it will be obvious that the force in either case varies inversely as the square of the time. Therefore, it may be generally stated that if the time allowed for the return of the shearing mechanism is doubled, the force required will only be one-fourth as great. In this manner I am enabled to conserve substantially all of the energy stored up in the pressure tank 21 and produce the return movement of the parts by the use of an electric motor having a relatively small developed horse power.

In Figure 2 there is illustrated a slightly modified form of my invention. In this figure, for the sake of brevity, I have illustrated parts corresponding to parts already referred to in detail with the same reference character having a prime affixed thereto. This form of my invention differs primarily from the form already described, in that the motor 43' is adapted to be continuously operated. The crank 47' and the pitman 48', are adapted to reciprocate the blocks 52 in the guides 53. The blocks 52 each have pivotally secured thereto a link 54. One of the links 54 is pivotally connected to the slide block 49', while the other link 54 is pivotally connected to the block 55. The blocks 52, and the blocks 49' and 55 are each in turn connected and maintained in fixed relation in one direction by rods 56. Extending diagonally from one of the blocks 52 to the block 49' are telescopically arranged rods 57 normally held in extended position by a spring 58.

Extending through an opening 59 in the guides 19' is a trip 60 having a pivotal mounting 61. The trip 60 is connected by a link 62 with a lever 63 having a pivotal mounting 64, and normally urged in one direction either by the gravity influence on the link 62 or by this influence plus that exerted by a tension spring 65. The free end of the lever 63 is normally adapted to engage a shoulder 65' projecting from the hub 66 of the arm 67 movable about a fixed pivot 68.

Downward movement of the cross head 15' will bring the same into engagement with the trip 60, thereby moving the rod 62 against the spring 65 and releasing the lever 63 from the shoulder 65'. This will permit the spring 69 to draw the arm 67 into the position illustrated in Figure 2 against the stop 70. In this position the nose 71 of the arm 67 will engage the pin 72 projecting from the block 55 and prevent the block from moving upwardly as the blocks 52 are reciprocated by the motor 43'. This will result in telescoping the members 57 against the action of the spring 58 and will move the blocks 49' and 55 away from the block 52 due to the straightening action of the links 54. This will bring the block 49' into the position illustrated in dotted lines in Figure 2, where it will engage the crosshead 15. Continued operation of the motor will cause the stop 73 on one of the links 54 to engage the pawl 74 and move the same against the action of the spring 75 and thereby force the nose 71 out of engagement with the pin 72. Thereafter, continued operation of the motor 43' will result in resetting the cross-head 15' and catch 23'. With this form of my invention the necessity of accelerating the motor 43' is obviated, as a continuous operating motor may be utilized.

In Figure 4 there is illustrated a slightly modified form of mechanism for maintaining the piston in its upper position. This mechanism is designed to take the place of the catch 23, if desired, and for the sake of conciseness the parts of the mechanism in this figure corresponding to parts already described are designated by the same reference characters having an $a$ affixed thereto. In this construction the guide way $19^a$ may be provided with a bracket 76 pivotally carrying the angular member 77 having a free end adapted to serve as an armature for the magnet $26^a$. Pivotally connecting an intermediate point of the member 77 with the cross-head $15^a$ are links 78. The member 77 and the links 78 constitute a toggle, the pivotal point 79 of which is adapted to lie out of the line of centers of the points 80 and 81, whereby when the magnet $26^a$ is deenergized the pressure of the fluid above the piston will immediately be effective for moving the shears to shearing position. The farther out the point 79 is from the line of centers of the points 80 and 81, the greater will be the strength of magnet required, but the quicker will be the release and operation of the mechanism.

With either form of the invention illustrated, the movement of the shearing mechanism to shearing position is accomplished by one source of power, while the return movement is accomplished by another source of power. By this arrangement I am able to conserve a large amount of power whereby the entire mechanism may be operated at a comparatively small cost. This constitutes an important advantage of the present invention.

I claim:

1. In a mechanism for shearing moving bodies, a movable shear frame, a plurality of shearing blades carried thereby, means exerting a continuous force for moving said frame and producing relative movement between said blades in shearing direction, and other means for producing both a return movement of said frame and a relative movement between said blades in the opposite direction, substantially as described.

2. In a mechanism for shearing moving bodies, a plurality of shearing blades, means exerting a continuous force for moving said blades to shearing position and for moving said blades with the material to be sheared, and other means for moving said blades from shearing position, substantially as described.

3. In a mechanism for shearing moving bodies, a swinging shear frame carrying shearing blades, means exerting a continuous force for swinging said frame and moving one of said blades relatively to the other in a direction to effect shearing, and other means for swinging said frame and producing relative movement between said blades in the opposite direction, substantially as described.

4. In a mechanism for shearing moving bodies, a shear frame carrying shearing blades, means exerting a continuous force for producing movement of said frame with the body to be sheared and other means for producing a return movement of said frame, substantially as described.

5. In a shearing mechanism, a plurality of shearing members, means exerting a continuous force for producing relative movement between said members in one direction and other means for producing movement between said members in the opposite direction, substantially as described.

6. In a shearing mechanism, a plurality of shearing members, fluid pressure means normally tending to produce relative movement between said members in shearing direction, means controlling such movement, and other means for producing relative movement between said members in the opposite direction, substantially as described.

7. In a shearing mechanism, a plurality of shearing members, fluid pressure means for producing relative movement between said members in one direction, and electrically operated means for producing relative movement between said members in the opposite direction, substantially as described.

8. In a shearing mechanism, shearing blades, continuously operating fluid pressure means tending to produce relative movement between said shearing blades in one direction, holding means preventing such movement, means for releasing said holding means, and means independent of said first mentioned means for producing relative movement between said blades in the opposite direction, substantially as described.

9. In a shearing mechanism, a plurality of shearing members, means tending continuously to move said members relatively to each other to effect a shearing operation, a catch engaging said means and preventing operation thereof, and means for rendering said catch inoperative, substantially as described.

10. In a shearing mechanism, a plurality of shearing members, means tending continuously to move said members relatively to each other to effect shearing operation, a holding means engaging said means and preventing operation thereof, and means for rendering said holding means inoperative, substantially as described.

11. In a shearing mechanism, a plurality of shearing members, means tending continuously to move said members relatively to each other to effect shearing operation, a holding means, and electrically operated means normally holding said holding means in engagement with said first mentioned means to prevent operation thereof, substantially as described.

12. In a shearing mechanism, a plurality of shearing members, a fluid pressure cylinder, a piston therein having operative connections for producing relative movement between said members, a supply of fluid pressure with one end only of said cylinder for maintaining a pressure therein effective for moving the piston in one direction to bring the shearing members into shearing position, and other means for moving the piston in the opposite direction, substantially as described.

13. In a shearing mechanism, a plurality of shearing members, a fluid pressure cylinder, a piston therein having operative connections for producing relative movement between said members, a supply of fluid pressure with one end only of said cylinder for maintaining a pressure therein effective for moving the piston in one direction to bring the shearing members into shearing position, and other means for moving the piston in the opposite direction to return to said supply the operating fluid delivered to said cylinder whereby the amount of fluid in said supply is maintained, substantially constant, substantially as described.

14. In a shearing mechanism, shearing members, a fluid pressure cylinder, a piston therein having operative connections for producing relative movement between said members, a source of fluid under pressure normally communicating with one end of said cylinder, the opposite end thereof being normally open to the atmosphere, and releasable means for holding said piston in one extreme position, substantially as described.

15. In a shearing mechanism, shearing members, a fluid pressure cylinder, a piston therein having operative connections for producing relative movement between said members, a source of fluid under pressure normally communicating with one end of said cylinder, the opposite end thereof being normally open to the atmosphere, releasable means for holding said piston in one extreme position, and piston operating means independent of said source, substantially as described.

16. In a shearing mechanism, a plurality of shearing members, a fluid pressure cylinder, a piston therein having operative connections for producing relative movement between said members, a supply of fluid pressure with one end only of said cylinder for moving the piston in one direction, and means for moving said piston in the opposite direction without supplying fluid under pressure from said supply, substantially as described.

In testimony whereof I have hereunto set my hand.

JULIAN KENNEDY, Jr.